United States Patent
Norton et al.

(10) Patent No.: US 7,163,226 B1
(45) Date of Patent: Jan. 16, 2007

(54) KING PIN SECURITY DEVICE

(75) Inventors: A. Frank Norton, Atlanta, GA (US); Michael W. Freitas, Colleyville, TX (US)

(73) Assignee: Falco, LLC, Atlanta, GA (US)

( * ) Notice: Subject to any disclaimer, the term of this patent is extended or adjusted under 35 U.S.C. 154(b) by 256 days.

(21) Appl. No.: 10/940,020

(22) Filed: Sep. 14, 2004

(51) Int. Cl.
*B62D 53/00* (2006.01)
*B62D 53/06* (2006.01)

(52) U.S. Cl. ............... 280/433; 280/491.4; 280/491.1; 280/491.3; 280/438; 280/423.1

(58) Field of Classification Search ............... 280/491, 280/491.1, 491.3, 433, 438, 423.1
See application file for complete search history.

(56) References Cited

U.S. PATENT DOCUMENTS

| | | | |
|---|---|---|---|
| 2,494,799 A | 1/1950 | Duvall et al. | |
| 2,656,706 A | 10/1953 | Lucas et al. | |
| 2,981,555 A * | 4/1961 | Abolins | 280/433 |
| 3,082,020 A * | 3/1963 | Hulverson et al. | 280/433 |
| 3,254,904 A * | 6/1966 | Jewell | 280/433 |
| 3,832,872 A | 9/1974 | Gerlach | |
| 3,922,897 A | 12/1975 | Mickelson | |
| 4,339,140 A * | 7/1982 | Abolins | 280/433 |
| 4,570,966 A * | 2/1986 | Giboney et al. | 280/433 |
| 4,620,718 A | 11/1986 | Mickelson | |
| 4,838,570 A * | 6/1989 | Toikka et al. | 280/507 |
| 5,052,203 A | 10/1991 | Cuyk | |
| 5,136,863 A | 8/1992 | Richardson | |
| 5,906,387 A | 5/1999 | Wallace | |
| 6,161,402 A | 12/2000 | Moore | |
| 6,547,271 B1 * | 4/2003 | Kleb et al. | 280/491.3 |
| 2002/0092330 A1 | 7/2002 | Hurst | |
| 2005/0167946 A1 * | 8/2005 | Rampp | 280/491.1 |

FOREIGN PATENT DOCUMENTS

| | | |
|---|---|---|
| JP | 08246730 | 3/1995 |
| WO | WO 00/10820 | 3/2000 |

* cited by examiner

*Primary Examiner*—Lesley D. Morris
*Assistant Examiner*—Marlon Arce-Diaz
(74) *Attorney, Agent, or Firm*—Locke Liddell & Sapp, LLP

(57) ABSTRACT

The present invention relates to a retractable king pin assembly for a trailer operable between an extended position, for engagement with a truck or tractor fifth wheel, and a retracted position, wherein the king pin is retracted to prevent engagement by a fifth wheel to permit the trailer to be left unattended without the threat of being stolen. The king pin security device includes a base member having an aperture, a king pin disposed in the base member aperture, and an actuator operatively connected to the king pin. The actuator either rotates or slides the king pin to move it in an axial direction between the extended and retracted positions. The actuator can include an electric motor, a solenoid or a hydraulic or pneumatic cylinder.

4 Claims, 5 Drawing Sheets

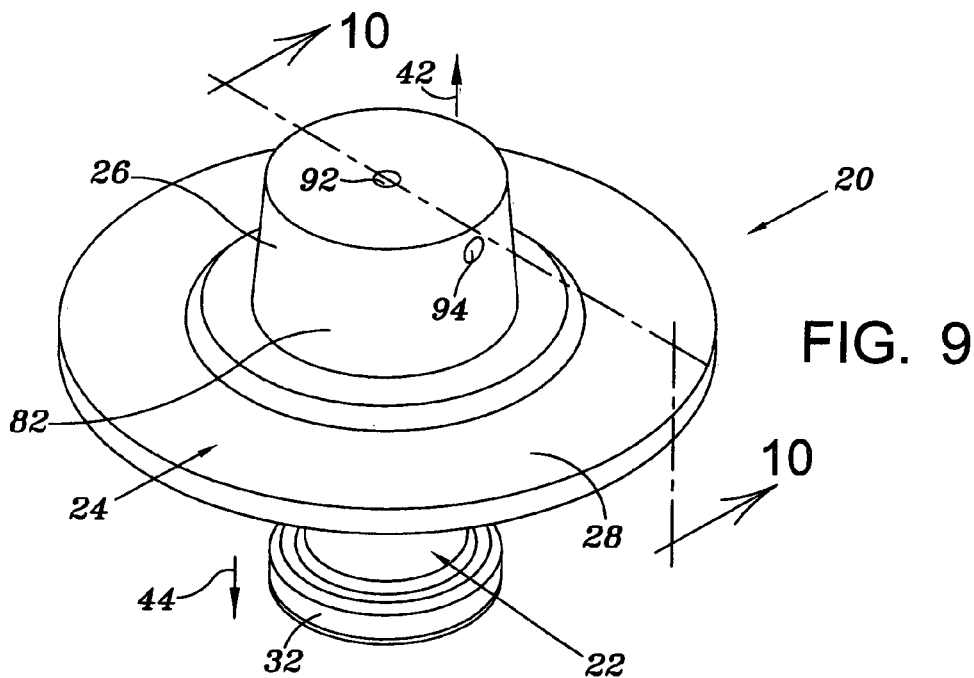
FIG. 9
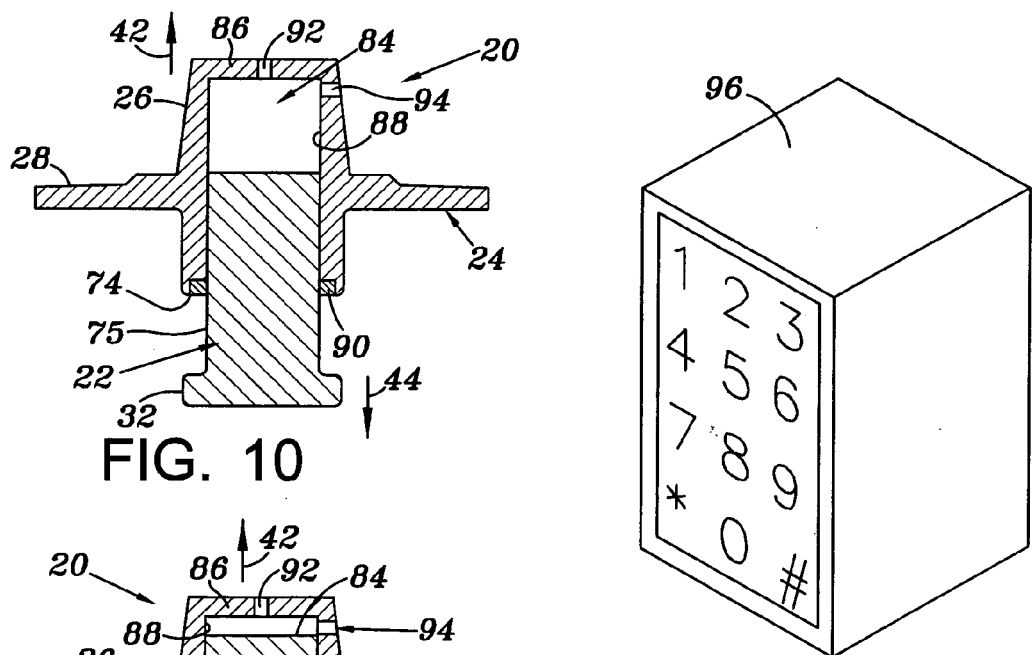
FIG. 10
FIG. 11
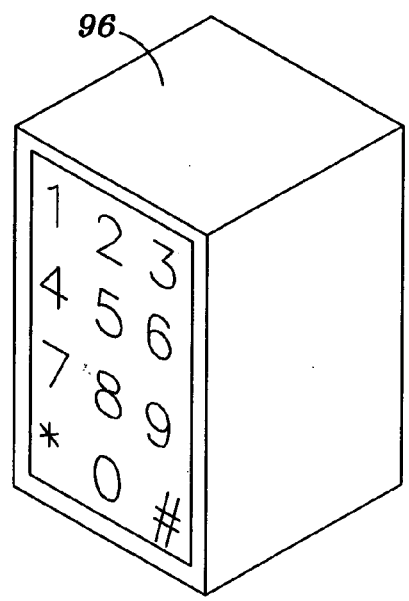
FIG. 12

KING PIN SECURITY DEVICE

TECHNICAL FIELD OF THE INVENTION

The present invention relates to trailer king pins, and more particularly, to a retractable king pin operable between an extended position for connection to a fifth wheel, and a retracted position, to prevent the unauthorized coupling to a fifth wheel.

BACKGROUND OF THE INVENTION

The standard mechanism used to couple truck tractors and trailers includes a fifth wheel mounted on the truck or tractor and a king pin mounted on the trailer. The king pin extends downwardly from the trailer and has an annular groove located around the outer surface of the king pin. The fifth-wheel has a slot or a set of jaws that are adapted to engage the grooved king pin.

One of the most serious problems facing the owners and operators of such tractor-trailer rigs is theft of the trailer and all of its contents. Oftentimes these trailers carry thousands of dollars worth of goods that are subject to theft when left unattended. This problem is due in part because the trucking industry has standardized the coupling mechanism between the truck tractors and trailers allowing any truck or tractor having a fifth wheel to engage any trailer having a king pin.

In order to combat the problem of theft of large trailers, king pin locking devices and security devices have been developed to attempt to combat thievery. These prior locking devices are oftentimes undesirable because many of these devices are heavy, difficult and time consuming too install and/or remove, require use of multiple parts, which oftentimes are become separated or lost, and are expensive to manufacture. Thus, there is a need to overcome these disadvantages.

SUMMARY OF THE INVENTION

The present invention relates to a retractable king pin assembly for a trailer. The assembly is operable between an extended position for engagement with a truck or tractor fifth wheel, and a retracted position, wherein the king pin is retracted to prevent engagement by a fifth wheel to permit the trailer to be left unattended without the threat of being stolen.

In a preferred embodiment, the king pin security device includes a base member for attachment to a trailer. The base member includes an aperture having a threaded sidewall to engage a threaded king pin that is rotabaly disposed in the base member aperture. As the king pin is rotated, the king pin moves in an axial direction so as to be raised or lowered between the extended and retracted position.

An actuator is connected to rotate the king pin which in turn moves the king pin in the axial direction between the retracted and the extended positions. In a preferred embodiment, the actuator includes a drive mechanism operatively connected to a worm assembly for rotating the king pin inside the base member aperture.

Alternatively, the king pin can be slideably disposed inside the base aperture and placed between the extended and retracted positions by a solenoid or a hydraulic or pneumatic pressurized cylinder.

BRIEF DESCRIPTION OF THE DRAWINGS

For a more complete understanding of the invention and for further advantages thereof, reference is now made to the following Description of the Preferred Embodiments taken in conjunction with the accompanying Drawings in which:

FIG. 9 is a front perspective view of an alternate embodiment of the king pin security device incorporating a pneumatic or hydraulic cylinder;

FIG. 10 is a section view of the king pin security device of FIG. 9 taken along the line 10—10 illustrating the king pin in the extended position;

FIG. 11 is a section view of the king pin security device of FIG. 9 taken along the line 10—10 illustrating the king pin in the retracted position; and FIG. 12 is a front perspective of a remote controller.

DESCRIPTION OF THE PREFERRED EMBODIMENTS

Figure 1:
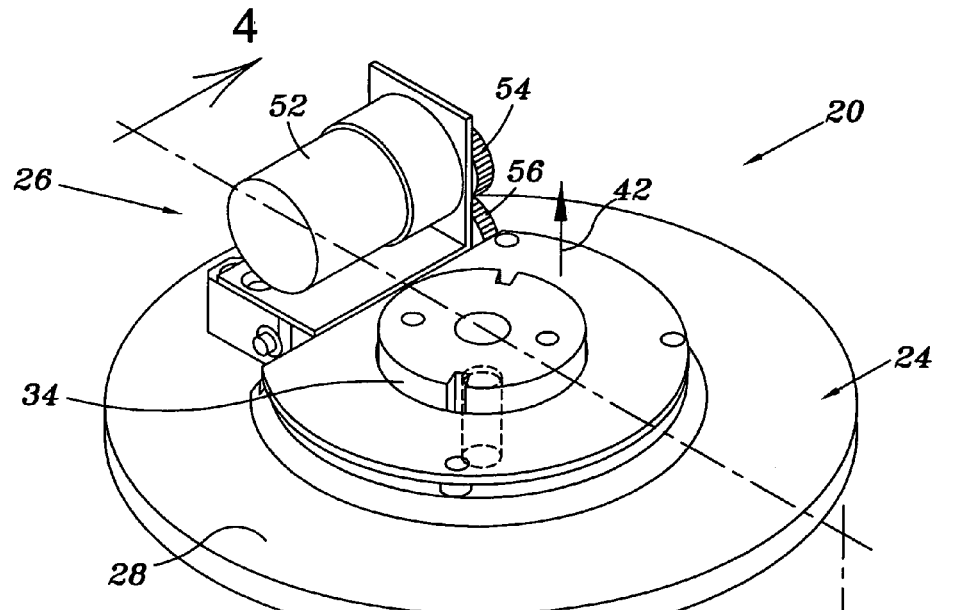
FIG. 1 is a front perspective view of the king pin security device in the extended position.
Figure 2:
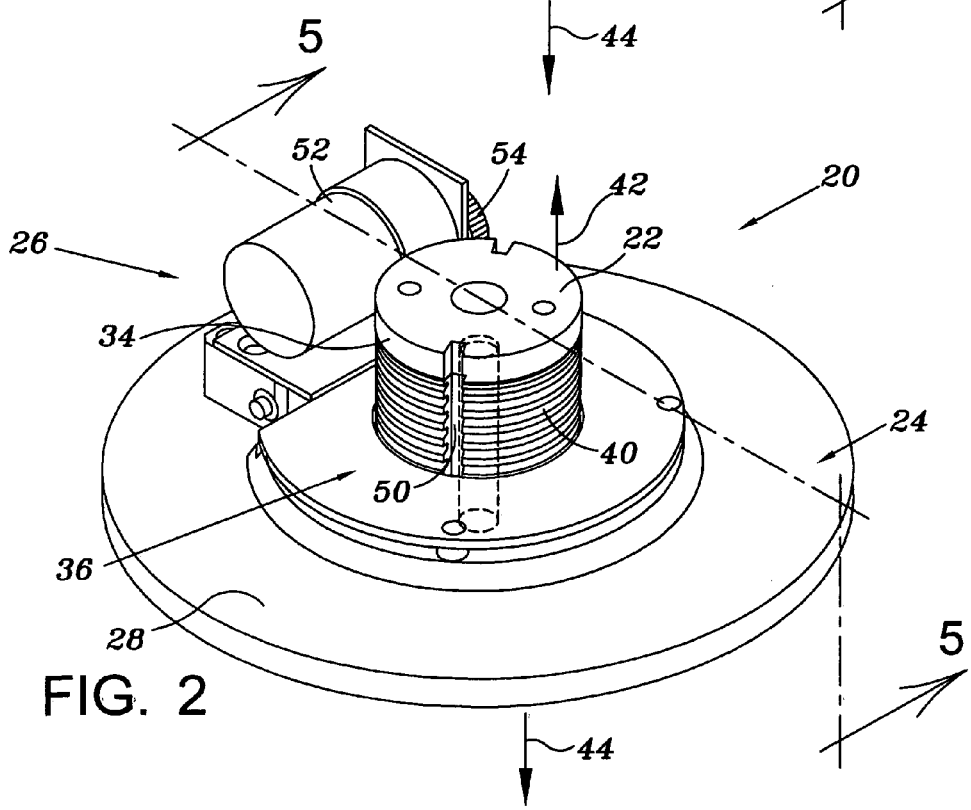
FIG. 2 is a front perspective view of the king pin security device of FIG. 1 in the retracted position.
Figure 3:
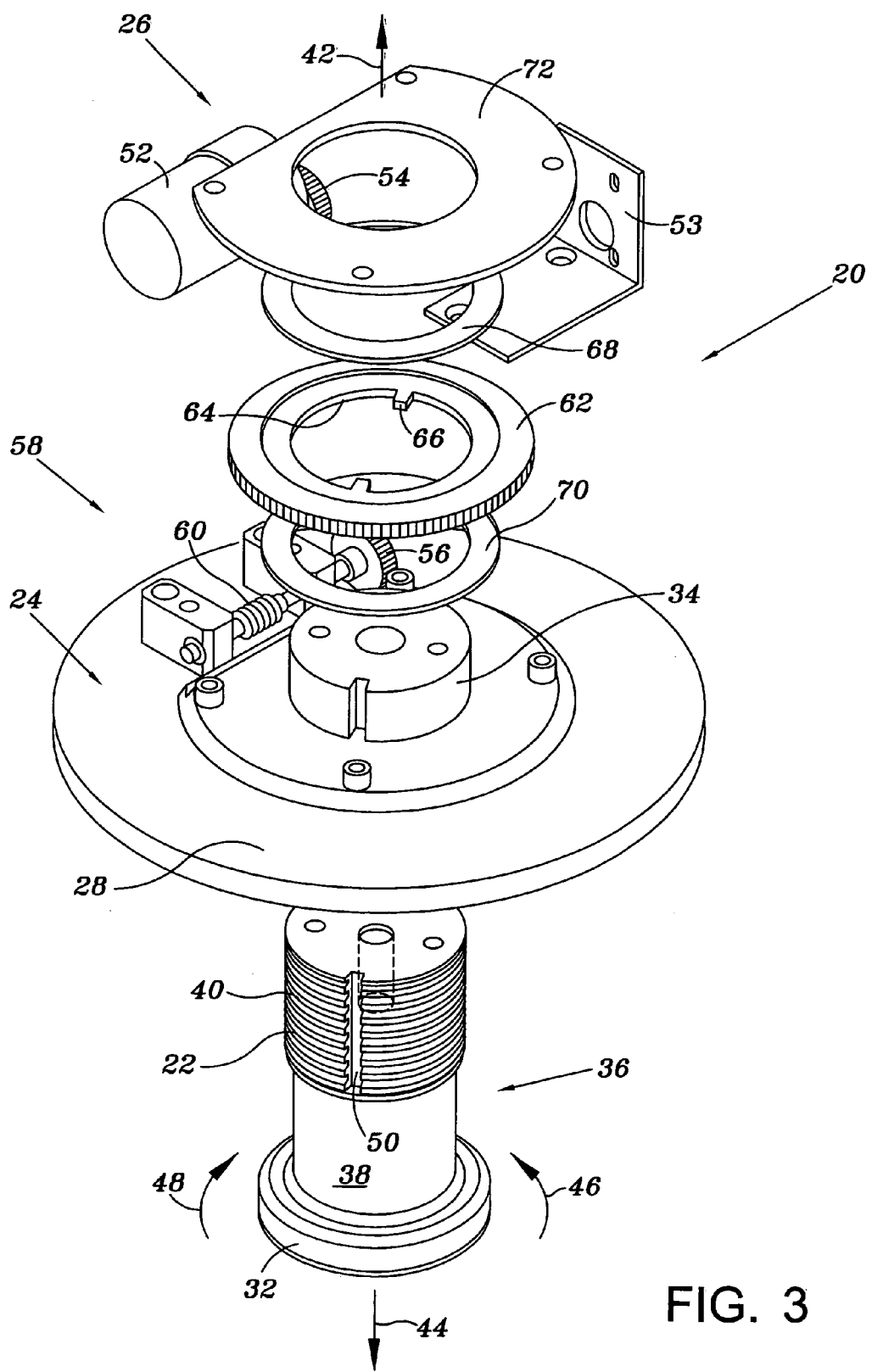
FIG. 3 is an exploded view of the king pin security device of FIG. 1.
Figure 4:
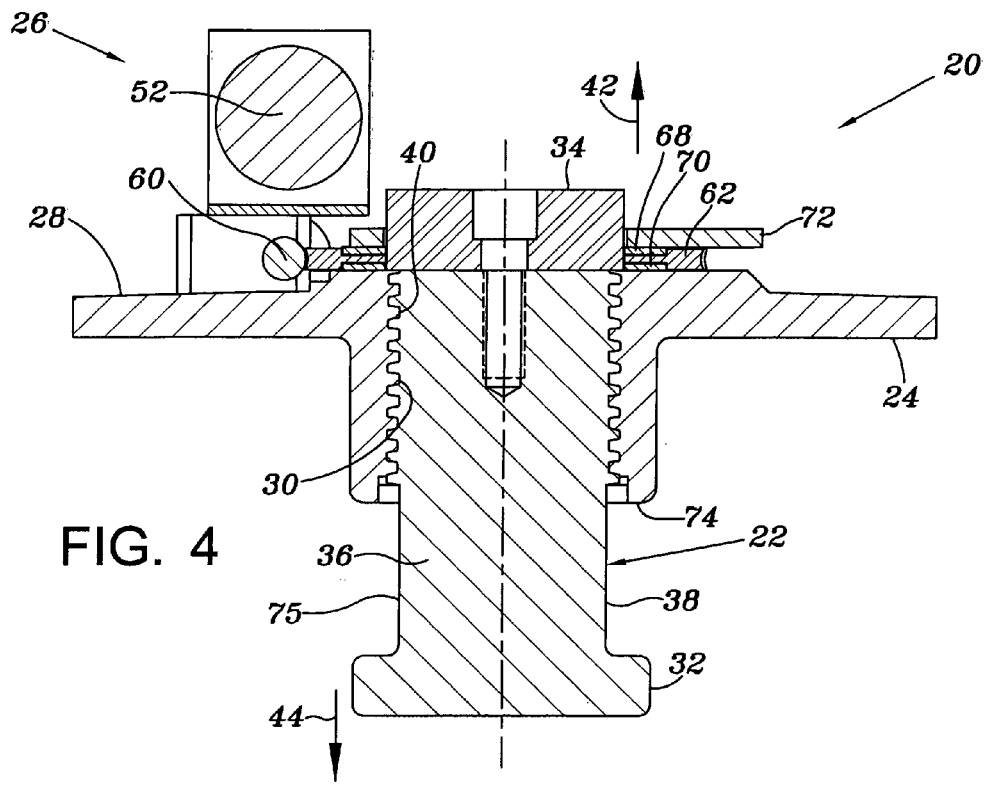
FIG. 4 is a section view taken along the line 4—4 of FIG. 1 illustrating the king pin in the extended position.
Figure 5:
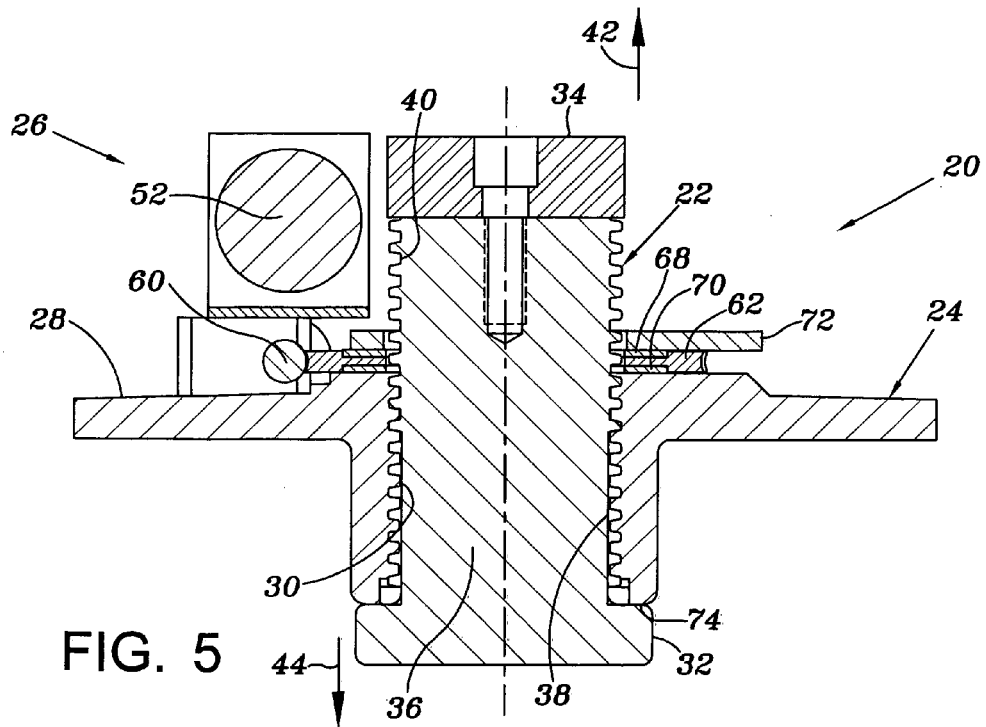
FIG. 5 is a section view taken along the line 5—5 of FIG. 2 illustrating the king pin in the retracted position.

Referring to FIGS. 1–5, the present king pin security device 20 includes a king pin 22, a king pin base 24 and an actuator 26 for placing king pin 22 in an extended position (FIGS. 1 and 4) and a retracted position (FIGS. 2 & 5). When in the extended position, king pin 22 depends downwardly from a trailer (not shown) so as to engage a truck or tractor fifth wheel (not shown). When in the retracted position, king pin 22 is retracted to prevent engagement by a fifth wheel, thereby allowing the trailer to be left unattended without the threat of being stolen.

King pin base 24 contains a planar portion 28 to support actuator 26 and to permit attachment to the trailer. King pin base 24 includes a threaded aperture 30 extending there through (FIG. 4) to receive king pin 22.

King pin 22 includes a cylindrical base 32, a removable cap 34 and a shaft 36 extending between base 32 and cap 34. As best seen in FIGS. 3 & 4, shaft 36 includes a non-threaded section 38 for engagement with the fifth wheel and a threaded section 40 for engaging threaded aperture 30 to move king pin 22 in an axial direction, as indicated by arrows 42 and 44. Axial movement commences when king pin 22 is rotated by actuator 26 in the direction of arrows 46 or 48 (FIG. 3), which causes movement in axial directions 42 or 44, respectively. As discussed more fully below, cap 34 and pin 22 each contain a groove 50 extending longitudinally along the sidewalls of cap 34 and threaded section 40 to receive and engage actuator 26.

Referring specifically in FIG. 3, actuator 26 preferably includes a motor 52 mounted on motor mount 53, a pair of spur gears 54, 56, and a worm set 58, all operatively connected to rotate king pin 22 in the direction of arrows 46 and 48. Worm set 58 consists of a worm 60 that turns worm gear 62. Gear 62 includes an interior aperture 64 having a diameter slightly larger than the diameter of king pin 22 such that king pin 22 can be inserted therein. Aperture 64 includes at least one tooth 66 and is sized to engage grooves 50 so that as worm gear 62 is turned, king pin 22 turns therewith.

Worm gear 62 is mounted on king pin base 24 between a pair of thrust bearings 68 and 70 (best seen in FIGS. 3 & 4) to facilitate the rotational movement of worm gear 62. A top plate 72 is disposed above thrust bearing 68 and is fixedly attached to king pin base 24 to securely fasten thrust bearings 68 and 70 and worm gear 62 to king pin base 24.

As seen in FIG. 4, when king pin 22 is in the extended position, cylindrical base 32 and a shoulder 74 define an annular groove 75 along non-threaded section 38 so that king pin 22 can engage a fifth wheel. When king pin 22 is in the retracted position (FIG. 5), cylindrical base 32 is adjacent shoulder 74 to prevent fifth wheel engagement with king pin 22.

Figure 6:
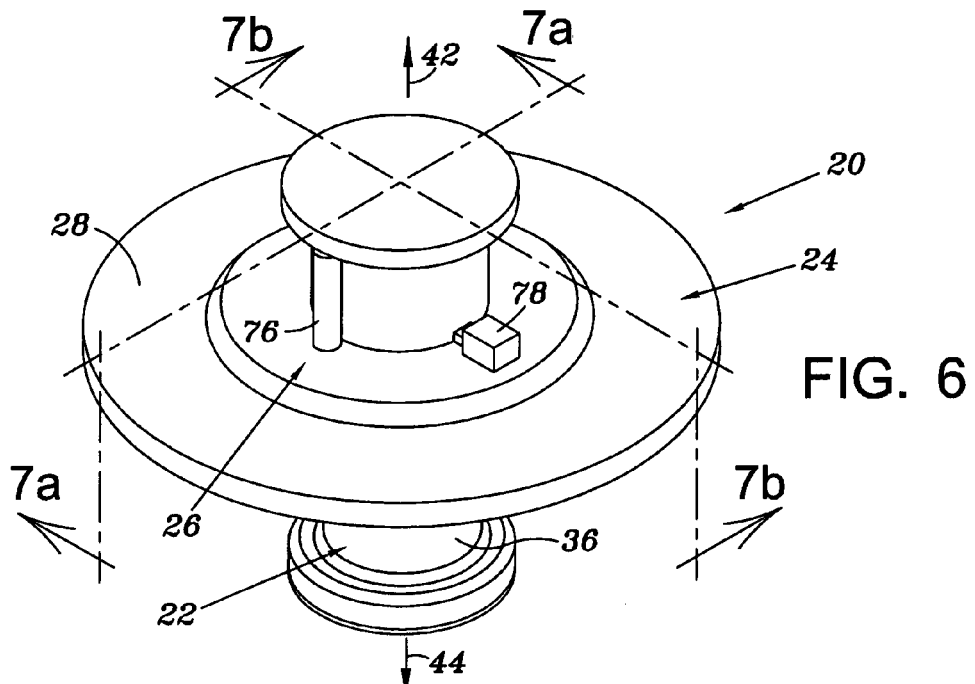
FIG. 6 is a front perspective view of an alternate embodiment of the king pin security device incorporating a solenoid actuator.
Figure 7A:
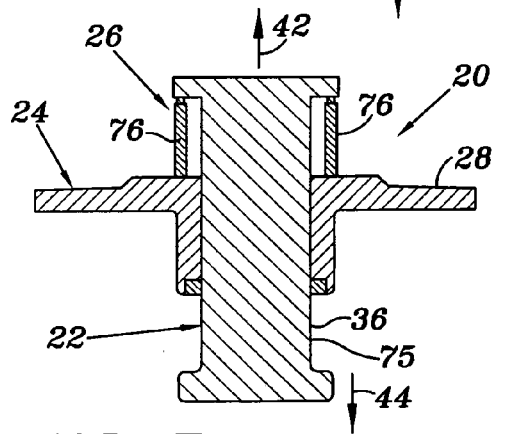
FIG. 7a is a section view of the king pin security device of FIG. 6 taken along the line 7a—7a illustrating the king pin in the extended position.
Figure 7B:
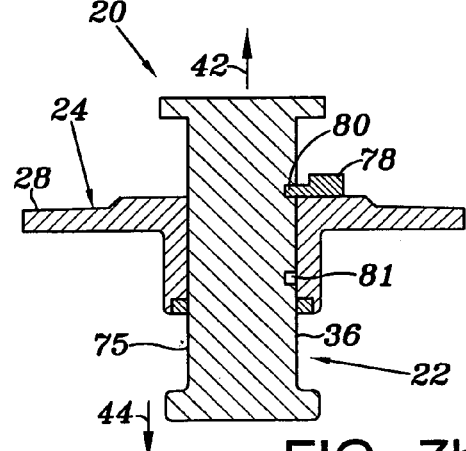
FIG. 7b is a section view of the king pin security device of FIG. 6 taken along the line 7b—7b illustrating the locking pin.
Figure 8:
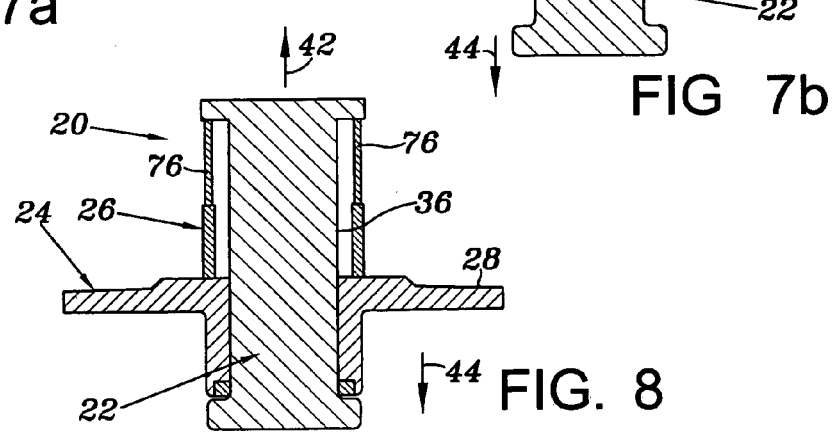
FIG. 8 is a section view of the king pin security device of FIG. 6 taken along the line 7a—7a illustrating the king pin in the retracted position.

FIGS. 6–8 illustrate an alternate embodiment of king pin securing device 20 where actuator 26 includes a solenoid 76 for moving king pin 22 between the extended position (FIGS. 6, 7a and 7b) and the retracted position (FIG. 8).

During operation, as current is supplied to solenoid 76, the solenoid acts on king pin 22 to place king pin 22 in the extended position. While in this position, a position lock 78 is actuated to engage a locking slot 80 on king pin 22 to prevent movement in axial directions 42 and 44. Position lock 78 maintains king pin 22 in the extended position so that annular groove 75 is exposed for engagement with a truck or tractor fifth wheel. In order to retract king pin 22, position lock 78 is actuated such that the lock is removed from king pin locking slot 80. Simultaneously, solenoid 76 acts on king pin 22 to place the pin in the retracted position, as best seen in FIG. 8. Position lock 78 engages locking slot 81 (FIG. 7b) to prevent axial movement when in the retracted position.

FIGS. 9–11 illustrate a king pin security device 20 having a pneumatic or hydraulic actuator 82. In this embodiment, a cylinder 84, defined by a top wall 86, a sidewall 88, and a seal 90 is adapted to receive king pin 22. During use, king pin 22 slideably engages sidewall 88 so as to be operable between the extended position (FIGS. 9 & 10) and the retracted position (FIG. 11) by varying the pressure inside cylinder 84. Pressure variances in cylinder 84 occurs by receiving and discharging fluid through two ports 92 and 94, which are connected to hoses, not shown. The hoses can extend and connect to a truck's power steering or brake pump, both of which are not shown. As pressure is increased inside cylinder 84, king pin 22 is configured in the extended position for engagement with the fifth wheel. Likewise, as pressure is reduced in cylinder 84, king pin 22 retracts inside cylinder 84 until cylindrical base 32 is adjacent annular shoulder 74 to prevent the unauthorized engagement with a fifth wheel. Pressurization of cylinder 84 can be controlled remotely from the cab of a truck by a conventional switching valve device, not shown.

Each of the above-described embodiments can be controlled remotely by a programmable controller 96, which can be programmed with an action code so as to permit actuation of on or more king pin security devices 20 from a remote location.

Although the preferred embodiments of the present invention have been illustrated in the accompanying drawings and described in the foregoing Description of the Preferred Embodiments, it will be understood that the invention is not limited to the embodiments disclosed but is capable of numerous rearrangements, modifications, and substitutions of parts and elements without departing from the spirit of the invention.

We claim:

1. A retractable king pin assembly operable between a retracted position for storage, and an extended position for engaging a fifth wheel truck trailer, the king pin comprising:
   a base member having an aperture wherein said aperture is defined by a threaded sidewall;
   a king pin rotatably disposed in said base member aperture for movement in an axial direction, said king pin having a threaded section for engaging said threaded sidewall; and
   an actuator operably connected to said king pin to rotate said king pin to move said king pin in said axial direction between the retracted position and the extended position, said actuator including a drive mechanism operatively connected to a worm assembly for rotating said king pin.

2. The king pin assembly of claim 1 wherein said drive mechanism is an electric motor.

3. The king pin assembly of claim 1 wherein said drive mechanism is attached to said king pin base member.

4. The king pin assembly of claim 1 wherein said worm assembly includes a worm gear and a worm for driving said worm gear, said worm gear including an aperture for receiving said king pin, said aperture having at least one tooth for engaging said king pin such that when said drive mechanism rotates said worm assembly, said king pin rotates.

* * * * *